US009256686B2

(12) United States Patent
Woodruff (10) Patent No.: US 9,256,686 B2
(45) Date of Patent: Feb. 9, 2016

(54) USING A BLOOM FILTER IN A WEB ANALYTICS APPLICATION

(75) Inventor: Travis Woodruff, Roanoke, TX (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 12/558,956

(22) Filed: Sep. 14, 2009

(65) Prior Publication Data

US 2010/0070514 A1   Mar. 18, 2010

Related U.S. Application Data

(60) Provisional application No. 61/097,174, filed on Sep. 15, 2008.

(51) Int. Cl.
   G06F 17/30      (2006.01)
   H04L 29/08      (2006.01)

(52) U.S. Cl.
   CPC .... *G06F 17/30867* (2013.01); *G06F 17/30067* (2013.01); *G06F 17/3089* (2013.01); *G06F 17/30949* (2013.01); *H04L 67/22* (2013.01)

(58) Field of Classification Search
   CPC ................. G06F 17/30067; G06F 17/30867; G06F 17/30949
   USPC ............ 707/698, 804, 754; 711/216; 709/224
   See application file for complete search history.

(56) References Cited

U.S. PATENT DOCUMENTS

| | | | | |
|---|---|---|---|---|
| 6,275,919 | B1 * | 8/2001 | Johnson | 711/216 |
| 7,620,624 | B2 * | 11/2009 | Stata et al. | 707/769 |
| 2008/0071903 | A1 * | 3/2008 | Schuba et al. | 709/224 |
| 2008/0147714 | A1 * | 6/2008 | Breternitz et al. | 707/803 |

OTHER PUBLICATIONS

Kirsch, Adam et al., "Less Hashing, Same Performance: Building a Better Bloom Filter", Division of Engineering and Applied Sciences, Harvard University, Cambridge, MA, LNCS 4168, pp. 456-467, 2006.*

Hua, Yu et al., "A Multi-attribute Data Structure with Parallel Bloom Filters for Network Services", Department of Computing, Hong Kong Polytechnic University, Kowloon, Hong Kong, LNCS 4297, pp. 277-288, 2006.*

Bloom, Burton H., "Space/Time Trade-offs in Hash Coding With Allowable Errors," *Communications of the ACM*, vol. 13, No. 7, (Jul. 1970).

* cited by examiner

*Primary Examiner* — Shahid Alam
(74) *Attorney, Agent, or Firm* — Winstead, P.C.

(57) ABSTRACT

Embodiments of the present invention are directed to the use of a Bloom Filter in a web analytics application. Large sets of data, obtained from on and offline sources, may be analyzed using a Bloom Filter to find desired patterns within the data. The use of a Bloom Filter in the analysis allows for a more efficient use of resources to perform the analysis.

12 Claims, 8 Drawing Sheets

FIG. 1

| USER ID (202) | TIME (204) | Activity (206) |
|---|---|---|
| 999 | Jan | View Page ID 123456 |
| 777 | Feb | Search Keyword = Cell Phone |
| 888 | Feb | View Page ID 123456 |
| 888 | Jan | Click on Flash Animation |
| 555 | Feb | View Page ID 999999 |
| 335 | Mar | Click on Active X Component ID 123 |
| 666 | Feb | View Page ID 987654 |
| 777 | Jan | View Page ID 999999 |
| 555 | Mar | Purchase Product Code 000123 |
| 333 | Feb | View Page ID 999999 |
| 222 | Mar | View Page ID 222222 |
| 111 | Jan | View Page ID 999999 |
| 222 | Mar | Purchase Product Code 000999 |
| 444 | Mar | View Page ID 123456 |

• • •

| | | |
|---|---|---|
| 555 | Apr | View Page ID 999999 |
| 777 | Jan | View Page ID 222222 |
| 333 | Apr | View Page ID 999999 |
| 777 | Apr | Purchase Product Code 000123 |
| 999 | Feb | Purchase Product Code 000123 |
| 444 | Apr | View Page ID 222222 |

USING A BLOOM FILTER IN A WEB ANALYTICS APPLICATION

CROSS-REFERENCES TO RELATED APPLICATIONS

This patent application is a non-provisional of and claims the benefit of U.S. Provisional Patent Application No. 61/097,174, filed on Sep. 15, 2008, which is incorporated by reference in its entirety for all purposes.

BACKGROUND

The present invention relates to on-demand web analytics, and in particular to analyzing web activity in relation to user segments.

The field of Web Analytics involves the collection of large amounts of data characterizing an internet user's web usage behavior. Examples of data that can be collected include the web page from which a user came, the pages viewed on a web site, if a purchase was made from the web site, the products viewed on the web site, etc. Such data can be collected for any number of different users over any number of different periods of time. The field of web analytics is dedicated to examining the vast amounts of data collected and determining if there are any useful patterns or similarities in the data across different users or groups of users. Discovery of such patterns or similarities may allow a web site owner to customize their web site in order to be more conducive to achieving certain goals, such as increasing sales.

One task that may be performed by a web analytics system is determining what web activities users satisfying certain criteria have also engaged in. For example, an administrator of an e-commerce web site, who may also be referred to as a client of the web analytics system, may wish to know which web pages have been viewed by users who made a purchase. Such information could be useful to the administrator in determining which pages are most likely to result in a sale. Another example may be of all the users who made a purchase in one month, what pages were viewed by those users in a subsequent month.

Web analytics systems capture vast amounts of data related to user's behavior on web sites. In some cases, analytics systems capture data related to every single page a user views, as well as any item on the page that the user clicks. Although the captured data is vast, it is relatively meaningless until processed to reveal patterns that are of value to a web site administrator. Often times, the administrator herself may not know what data will be meaningful at the time of collection. The administrator may wish to pose numerous "what if" type questions to the web analytics system in order to reveal useful data. For example, an administrator may ask "of users who purchased a product in January, how many viewed pages in February?" After receiving the results, it may be the case that no interesting patterns are revealed. The administrator may then ask "of users who purchased a product in February, how many viewed pages in January?" The second query may reveal that users who make purchases on the web site generally only do so after multiple visits.

Providing the ability for a web site administrator to query web usage data using unknown criteria poses several challenges to designers of web analytics systems. One of these challenges is the vast amount of collected data may not necessarily be structured in the form that is most conducive to answering the particular query presented. Continuing with the previous example, the web site administrator may have a list of all users that made a purchase in a given month. These users may be identified by a user ID. The group of users who satisfy the specified criteria may be referred to as a segment. The administrator may wish to know what web pages were viewed in the previous month by the users in the segment.

A naïve approach to this problem would entail the use of a nested loop join. An outer loop would iterate over each stored web activity. For each activity, an inner loop will compare the user ID associated with the activity to each user ID of users that made a purchase. If a match occurs, the web activity is added to the results set. Once each user ID in the set of users who made a purchase has been iterated, the process repeats, moving on to the next stored web activity. The nested loop join approach is extraordinarily inefficient and thus time consuming. In a best case scenario, where each and every stored web activity is associated with a user who made a purchase, on average each web activity would be compared to ½ the total number of users who made a purchase. In a more realistic scenario, some, if not most, of the stored web activities will be associated with user IDs that did not make a purchase. In such a case, each activity associated with a non-purchasing user ID would be compared to the full set of user IDs that made a purchase, only to determine that the activity should not be added to the results set.

An alternative approach that is slightly more efficient would be to use a lookup structure to perform a hash join. Each user ID that made a purchase could be loaded into a lookup structure, such as a hash table. The user ID for each web activity can then be hashed to determine if the user ID is contained in the hash table. The hash join approach has its own disadvantages. One problem occurs when a large number of users have made a purchase. The hash table itself may not fit into memory, requiring expensive and inefficient swapping of portions of the hash table into and out of memory. Furthermore, there is the complexity of properly sizing the hash table. Choosing too large a size results in a sparsely populated table, which could lead to the memory problems discussed above. Choosing too small a size results in large numbers of user IDs hashing to the same hash bucket, which would then result in further processing of all the entries contained in that hash bucket.

Yet another approach involves sorting both the web usage activity and the user IDs of those users who made a purchase. This may be referred to as a sort merge join. The algorithm for performing a sort merge join is complex and inefficient. Although the sort merge join may provide some efficiencies in the matching stage, the processing required to sort is excessive. When the set of stored web activities is large, as it is expected to be in web analytics applications, the sorting step alone becomes prohibitively expensive.

Embodiments of the present disclosure provide systems and methods for efficient filtering of usage activity based on segments.

BRIEF SUMMARY

Embodiments of the invention include a method of using a Bloom Filter in a web analytics application. A first set of data elements can be analyzed to determine if a first criteria is met. Elements that satisfy the criteria can be entered into a Bloom Filter. The Bloom Filter may then be applied to a second set of data elements. Elements of the second set of data that are included in the Bloom Filter may be extracted from the second set of data.

In one embodiment a tangible computer readable medium is provided that contains instructions for causing a processor to execute the functions of embodiments of the invention. Embodiments of the invention may begin by identifying a first set of data elements that satisfy a first criteria. In some embodiments, this may include users who have been assigned to a segment. A segment may be a list of user IDs of users who satisfy a defined criteria, such as users who purchased a particular product.

Identification information, such as a user ID associated with each element in the first set of elements may be entered into a Bloom Filter. Entering information into a Bloom Filter may comprise processing the user identifier with a defined set of hash functions, each hash function mapping the user identifier to a single bit position in the Bloom Filter. In some embodiments, the number of defined hash functions is six.

In some embodiments, the Bloom Filter may then be applied to a set of user activities. Applying a Bloom Filter to a set of user activities may comprise processing a user identifier associated with each of the activities with the same set of hash functions used to populate the Bloom Filter. If the bits determined by the hash functions in relation to the user activities are all set in the Bloom Filter, this indicates that the user identifier associated with the activity may be included in the set of user identifiers entered into the Bloom Filter.

In some embodiments, if an activity is determined to be associated with a user identifier that has been entered into the Bloom Filter, the activity is added to a results set. In some embodiments, there is a possibility that the result set may contain false positives, wherein an activity is added to the results set that should not have been. In some aspects, the result set my be further processed to remove the false positives.

In some embodiments, user identifiers from multiple segments may be included in the Bloom Filter. In such embodiments, user activities associated with user identifiers from any or all of the segments that were added to the Bloom Filter may be entered into the results set.

In addition to computer readable medium, systems and methods for performing the functions of embodiments of the invention are also provided.

DETAILED DESCRIPTION

Exemplary System

Figure 1:
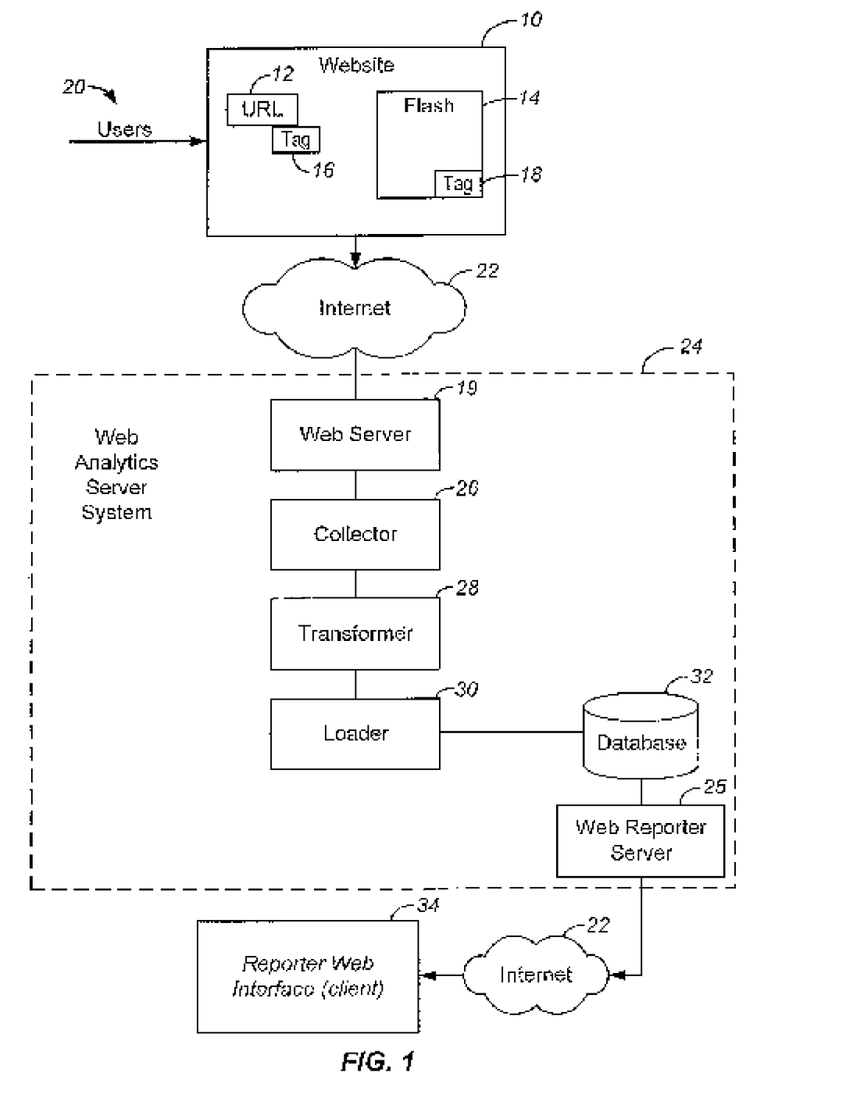
FIG. 1 depicts an exemplary system for capturing web usage data.

FIG. 1 is a block diagram of an example of a system used to collect web analytics data. A web server 10 provides web pages, flash, and other local applications 14 that are addressable by URLs 12. Each of these web based resources has an associated tag 16 and 18, respectively, for tracking clicks by users 20. The tags collect the user click information and transmit it over the internet 22 to a web analytics server or tracking server 24.

Web analytics server 24 collects the data received by a web server 19 with a collector component 26, and assembles queues of data in transformer components 28. The transformed data is then loaded into a database 32 by a loader 30. The data in the database is analyzed, checked, and validated over time, then provided to a client using various delivery mechanism such as a browser application, data downloads, data exports, web based API, emails, and other delivery mechanisms from a web reporter server 25 through Internet 22 to a client computer 34.

Although FIG. 1 depicts a single web server 10, this is for simplicity of explanation only. In some embodiments, there may be an arbitrary number of web servers 10, hosting any number of web sites, all of which are sending data to web analytics server 24. The remainder of the disclosure will refer to all data collected by web analytics server 24 and stored in database 32 as web activities. Web activities can include pages viewed, products purchased, hyperlinks clicked, or any number of other activities that may be performed on a web site. In some embodiments, every single action performed by a user on a web page is stored as a web activity.

Furthermore, in addition to storing web activities, database 32 may also interface with offline systems, such as a merchant's brick and mortar stores. User's activities at the physical location may also be stored in database 32, and those activities can be integrated within the web analytics system. For example, a user who makes a purchase at a merchant's brick and mortar store may have that purchase activity stored in database 32. For ease of description, the remainder of the disclosure will refer to web activities, but it should be understood that embodiments of the present disclosure are equally applicable to activities that are conducted offline, as well as online.

Figure 2:
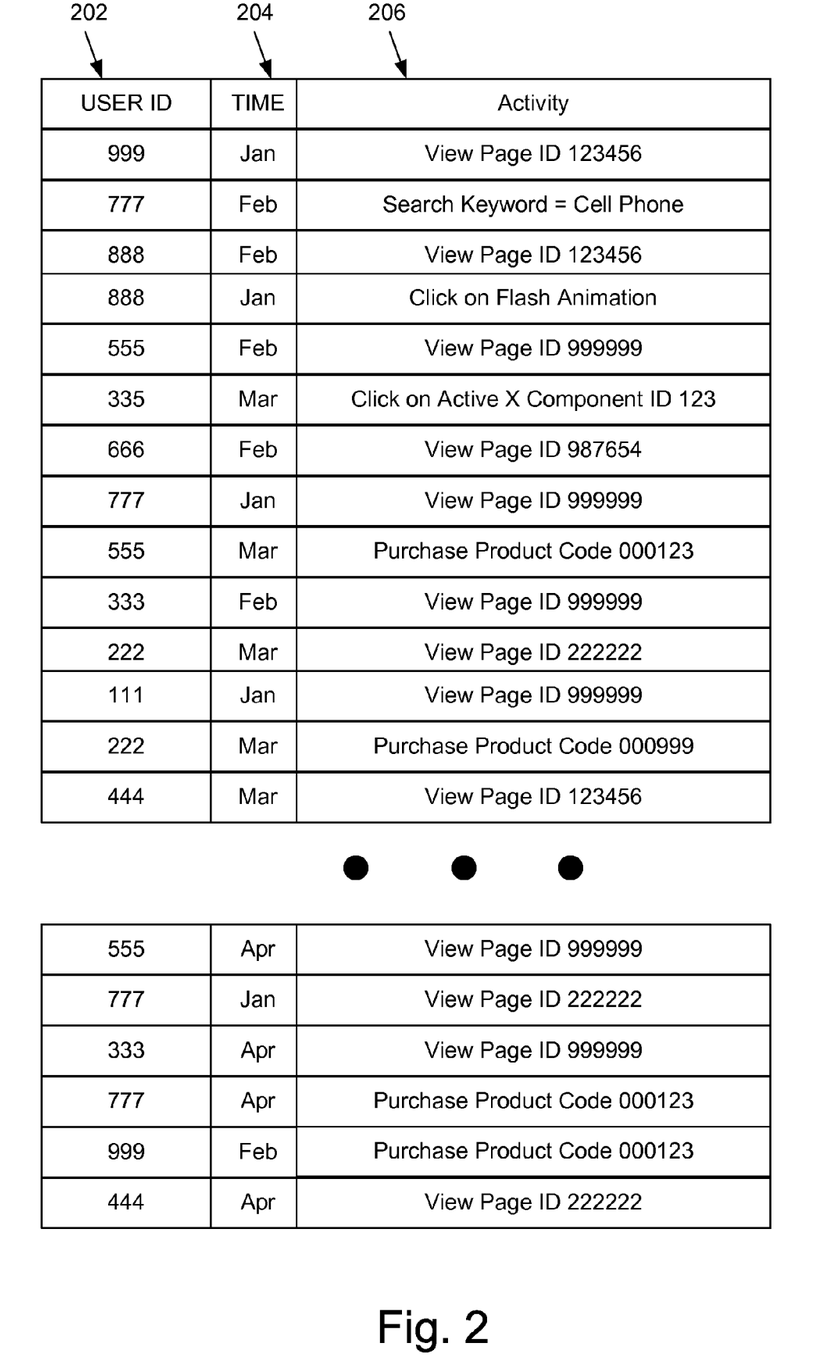
FIG. 2 depicts a portion of exemplary web activities.

FIG. 2 depicts a portion of exemplary web activities that may be stored in database 32. Although certain exemplary details about what data is stored are presented, this is for purposes of simplicity of explanation only. The level of detail stored for web activities can be much more granular that depicted in FIG. 2.

Exemplary Data

FIG. 2 depicts three exemplary data elements that may be stored for every web activity. Element 202 is a user ID that will be used to identify a specific web user. In some embodiments, the user ID may be an alpha numeric identifier that is uniquely assigned to each user. All web activities performed by the user on web sites provided by web servers 10 will be stored in database 32 tagged with the user ID. Although the user ID is described as being an alphanumeric identifier, any other identifier suitable for identifying an individual user has also been contemplated.

Web activities can also include a time 204 that the activity occurred. Time 204 as depicted in FIG. 2 is described with a monthly granularity level. It should be clear that this level of granularity is exemplary, and is not limiting. In some embodiments, granularity for time may be as fine as the particular millisecond the web activity occurred. Any level of granularity for the time an activity occurred has been contemplated.

Web activities can also include the specific web activity 206 that occurred. For example, it can include a page identifier of a viewed page, a product purchased, a flash application launched, an item clicked, or any number of other web activities. The level of detail stored is not limiting, and in some embodiments can extend to every single view, selection, or mouse movement on a web page.

It should be understood that user ID 202, time 204, and web activity 206, are only three exemplary details that may be stored for each web activity. In some embodiments, further details, such as web site visited, product code of a purchased product, time spent viewing a page, or any other details about a user's web usage activity may be stored. It should also be clear that FIG. 2 represents a small number of web activities. In a fully operationally web analytics system, there will typically be millions of stored web activities. The user ID 202, time 204, and web activity 206 are generally presented as text in FIG. 2 for ease of explanation. In some embodiments, each of those fields may be represented by purely numeric information. For example, a view of a certain page could be associated with a unique number that identifies the page, and this may be stored in the database 32.

Figure 3:
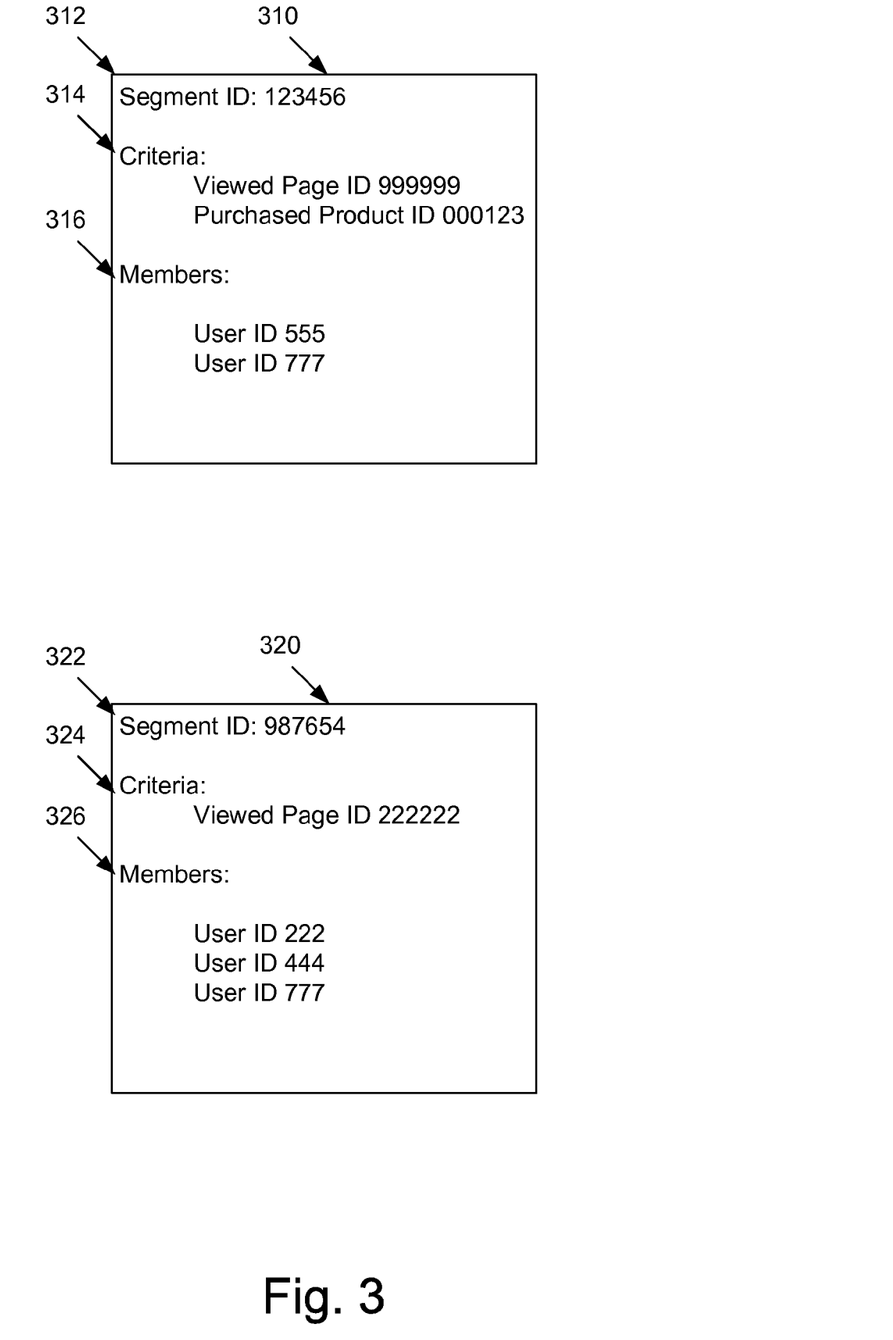
FIG. 3 depicts exemplary user segments.

FIG. 3 depicts exemplary user segments. As mentioned briefly above, a segment is a potentially large group of users that are identified by some defined criteria. For example, all users who viewed a specific web page could form one segment. All users who purchased a specific product could form another segment. As should be clear, there can be overlap of segments, and each user may belong to any number of different segments.

For example, a segment could be defined as users who visited a specific web page and who purchased a product X. Another segment could be defined for users who visited the same specific web page and purchased product Y. A user who has viewed the specific web page and has purchased both products X and Y would be included in both segments. As an example of an overlapping segment, a segment may be defined to include users who viewed a specific web page. A second segment could be defined for users who visited the same specific web page, and purchased a product X. As should be clear, the first segment would be a subset of the second segment.

User segment 310 is an exemplary segment. This exemplary segment is based on the web activity data depicted in FIG. 2. The segment may have a segment identifier 312 that is used for identification of a particular segment. The segment may also have criteria 314 that define the segment. In the exemplary segment 310, the specified criteria are users who have viewed Page ID 999999 and have also purchased product ID 000123. As can be seen in segment 310, two users 316, with IDs 555 and 777 satisfy the specified criteria 314. User segment 320 is an example of a second segment. As shown, segment 320 has its own segment identifier 322, segment criteria 224, and segment members 226.

The creation of user segments can occur in any number of ways. For example, a client may define criteria for a segment, such as that depicted in FIG. 3. When user web activities, such as those collected by the system depicted in FIG. 1 are received, the web analytics server may compare the activities to the defined segments. If a match occurs, the user ID of the matching user is added as a member of the segment. In an alternate embodiment, segments may be created in near real time. For example, a client may wish to know all users who purchased a certain product. The web activity data stored in database 32 may be searched to identify all users that meet the criteria, and the user IDs of those users added to the members of the segment. Any method of segmenting users is contemplated and would be suitable for use with embodiments of the present disclosure.

Once a segment has been defined, a client system may desire to analyze web activities as depicted in FIG. 2 with respect to the defined segments. For example, the client may wish to know for all users in segment ID 123456, what other web activities did those users engage in? As explained above, methods for searching large volumes of web activities to select only those activities associated with a specific segment are highly inefficient. Embodiments of the present disclosure advantageously provide a higher efficiency solution through the use of a Bloom Filter, whose operation will be described below.

Bloom Filter

A Bloom Filter is an efficient data structure that may be used to determine if a given element is contained within a set of elements. An empty Bloom Filter is an array of bits set to zero. For purposes of explanation, assume the array of bits has m number of bits. A number of hash functions can be defined. Assume for purposes of explanation that there are k hash functions. Each hash function will map a key value of an element to one bit position in the array. Ideally, each hash function will map a key value to a bit position in the array in a uniform manner over the entire array. In order to insert an element into the Bloom Filter, the key value is run though each hash function. Each hash function will map the key value to a bit position in the array, and those bit positions will be set to 1.

Figure 4:
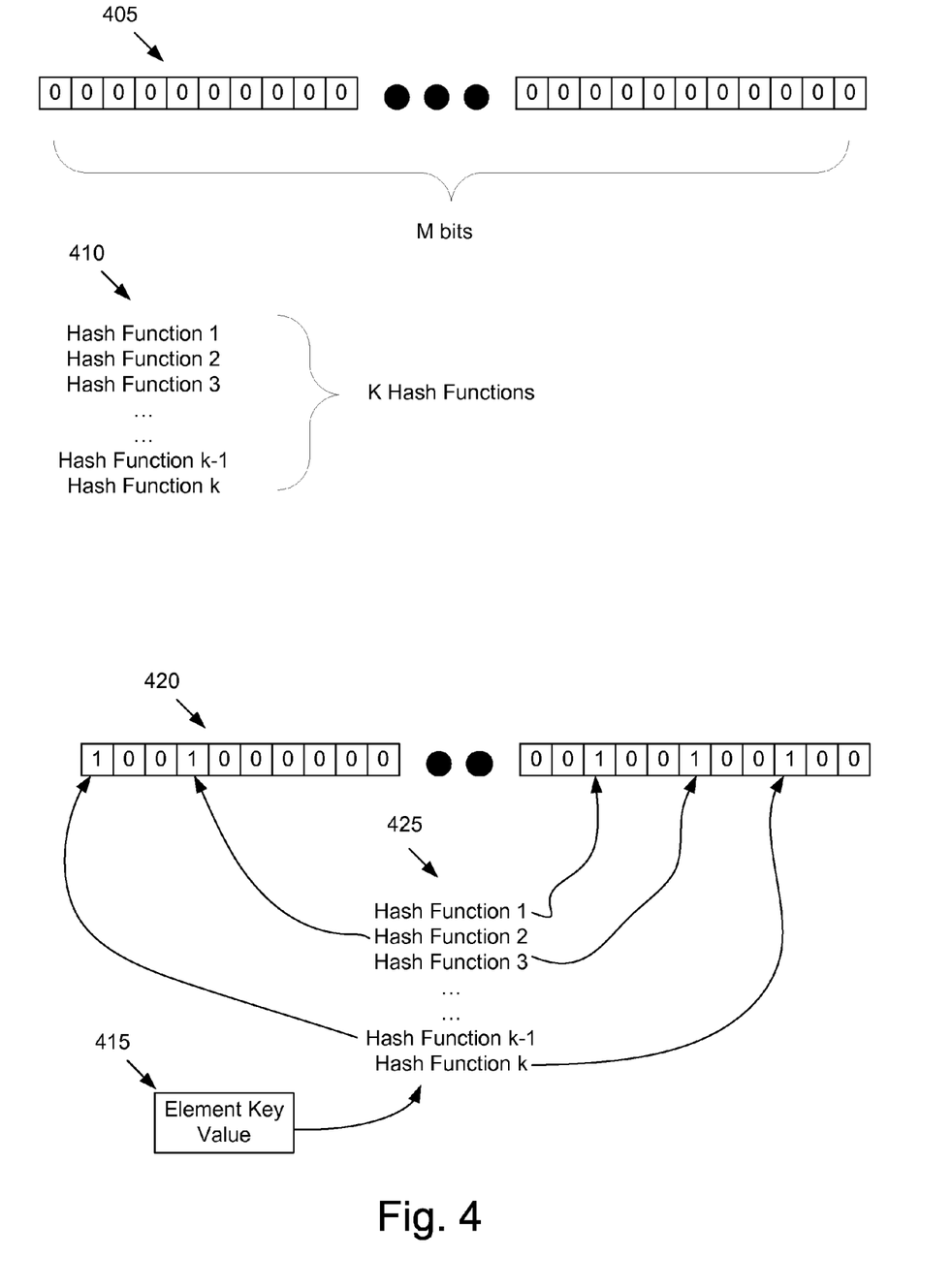
FIG. 4 depicts operation of a Bloom Filter

FIG. 4 depicts an exemplary empty Bloom Filter 405. As mentioned above, an empty Bloom Filter is a set of m bits. Corresponding to the Bloom Filter will be a set of k hash functions 410. Each hash function of the set will map an input key value to a single bit position in the Bloom Filter. A proper set of hash functions will be independent of each other, and each hash function will map a key value of an element to one of the m bit positions with a uniform random distribution.

In order to insert an element into the Bloom Filter, the key value of the element is processed by each of the k hash functions. Each hash function specifies a bit that should be set in the Bloom Filter. To insert an element in the Bloom Filter, the bits corresponding to the hash functions are set to 1. For example, to insert an element with a key value 415 into the Bloom Filter, the key value is processed by the k hash functions 420, resulting in k bit positions within the Bloom Filter that should be set to 1. As depicted in Bloom Filter 425, the bit positions corresponding to each of the hash functions are set to 1.

In order to determine if an element is included in the set of elements that have been added to the Bloom Filter, the key value of the element is run through the hash functions. If any of the bit positions mapped to by the hash functions are set to zero, the element is guaranteed to not be included in the set. If all of the bit positions mapped to by the hash functions are set to 1, the element may be in the set, with a certain probability of being a false positive. The percentages of false positives can be manipulated through the choice of the length of the array of m bits and the number k of hash functions.

A further and more complete description of a Bloom Filter can be found in "Space/time trade-offs in hash coding with allowable errors", Communications of the ACM 13 (7): 422-426, doi:10.1145/362686.362692, by Burton H. Bloom. Embodiments of the present disclosure advantageously use Bloom Filters to sort through massive amount of web analytics data.

Use of a Bloom Filter to Filter Web Usage Data Based on a Segment

Figure 5:
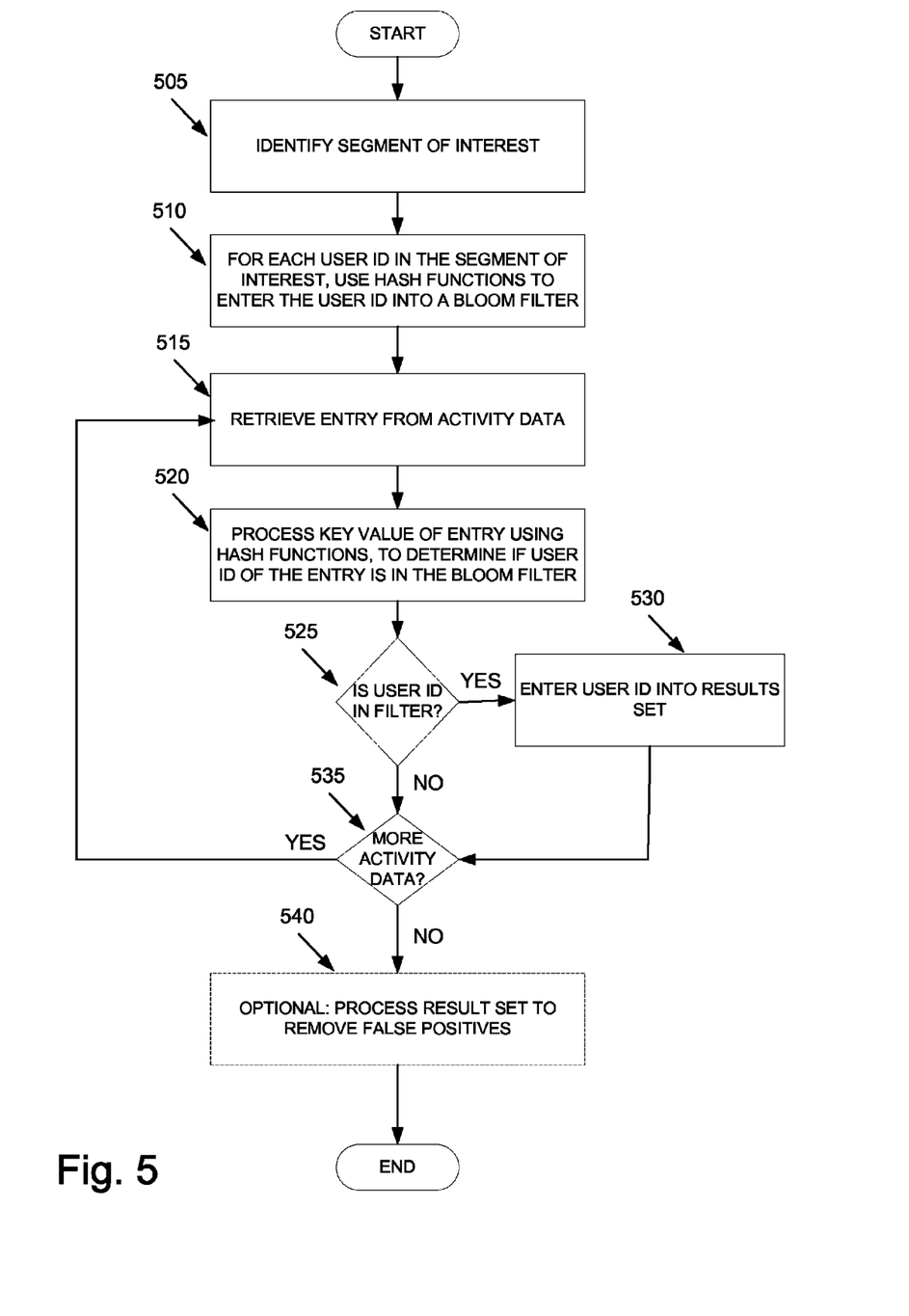
FIG. 5 depicts use of a Bloom Filter to filter web usage activity by a single segment.

FIG. 5 depicts use of a Bloom Filter to filter web usage activity by a single segment. The process may begin at step 505, wherein the segment of interest is obtained. As explained above, a segment may comprise a list of user IDs that satisfy criteria specified by a client. The process may then continue to step 510, wherein each user ID in the segment of interest is processed by a defined number of hash functions of a Bloom Filter, in order to insert the user ID into the Bloom Filter.

In one exemplary embodiment, the size of the Bloom Filter may be defined to be extremely large, such as 64 megabytes (536,870,912 bits). The use of a large size for the Bloom Filter is helpful in the elimination of false positive results. As explained above, the false positive rate is statistically determined based on the size of the Bloom Filter and the number of hashes. Using large numbers for both the size of the filter and the number of hashes reduces the overall percentage of false positives. Although the use of a 64 megabyte Bloom Filter is described, alternate embodiments may use Bloom Filters of any size, either larger or smaller than 64 megabytes.

In an exemplary embodiment, the number of hash functions that will be used with the Bloom Filter is six. Alternate embodiments may use any number of hash functions, as desired by the client to achieve an appropriate false positive rate. Any hash function that meets the requirements specified above for use in a Bloom Filter are suitable. In one embodiment, processing the user IDs for insertion into the Bloom Filter begins with processing the user ID with the standard String.hashCode( ) function of the Java programming language. The result of the String.hashCode( ) function may be a 32 bit value. The 32 bit value may then be used to create the six unique hash functions specified above.

In one embodiment, the size of the Bloom Filter, in bits, modulus the 32 bit value is calculated. The result will determine the bit within the Bloom Filter that should be set. The 32 bit value may then be rotated by 3 bits, and the modulus operation performed again, to determine the second bit in the Bloom Filter to set. The process may continue until all six bits corresponding to the desired number of hash functions have been determined and set in the Bloom Filter. The entire process may then repeat for the next user ID in the segment. Once all of the users in the segment have been entered into the Bloom Filter, the process can continue to step 515.

At step 515, the first activity from the web activities database may be retrieved. At step 520, the user ID associated with the web activity can be processed by the same method as described above with respect to entering user IDs belonging to a segment into the Bloom Filter. In one embodiment, as each bit position is determined from the hash functions, a comparison is made to the corresponding bit position in the Bloom Filter. If the bit is set to zero, this is conclusive proof that the user ID of the web activity is not included in the identified segment, and it is unnecessary to continue calculating additional hashes. At step 525, if all the bits determined by the hash functions are set to 1 in the Bloom Filter, the web activity may then be entered into a results set at step 530.

At step 535, it is determined if there are more entries in the activity data to be processed. If so, the process returns to step 515 to retrieve the next activity. If there are no more activities, the process continues to optional step 540. As mentioned above, a Bloom Filter may be used to determine if an element is not in a set with absolute accuracy. However, there is a false positive percentage that based on the size of the Bloom Filter, and the number of hashes used. As such, the results set created in step 530 may contain some activities whose user IDs are not included in the segment of interest. If absolute accuracy is required, the result set may be processed further to remove the false positives.

In some embodiments, the false positives are identified using one of the less efficient algorithms, such as the nested loop join, that was discussed above. Because the result set should only contain a small number of false positives, and because the result set has already been reduced in size significantly from the entire set of web activity data, the use of the less efficient algorithms may be acceptable. In cases where absolute accuracy is not needed, optional step 540 may be omitted.

Figure 6:
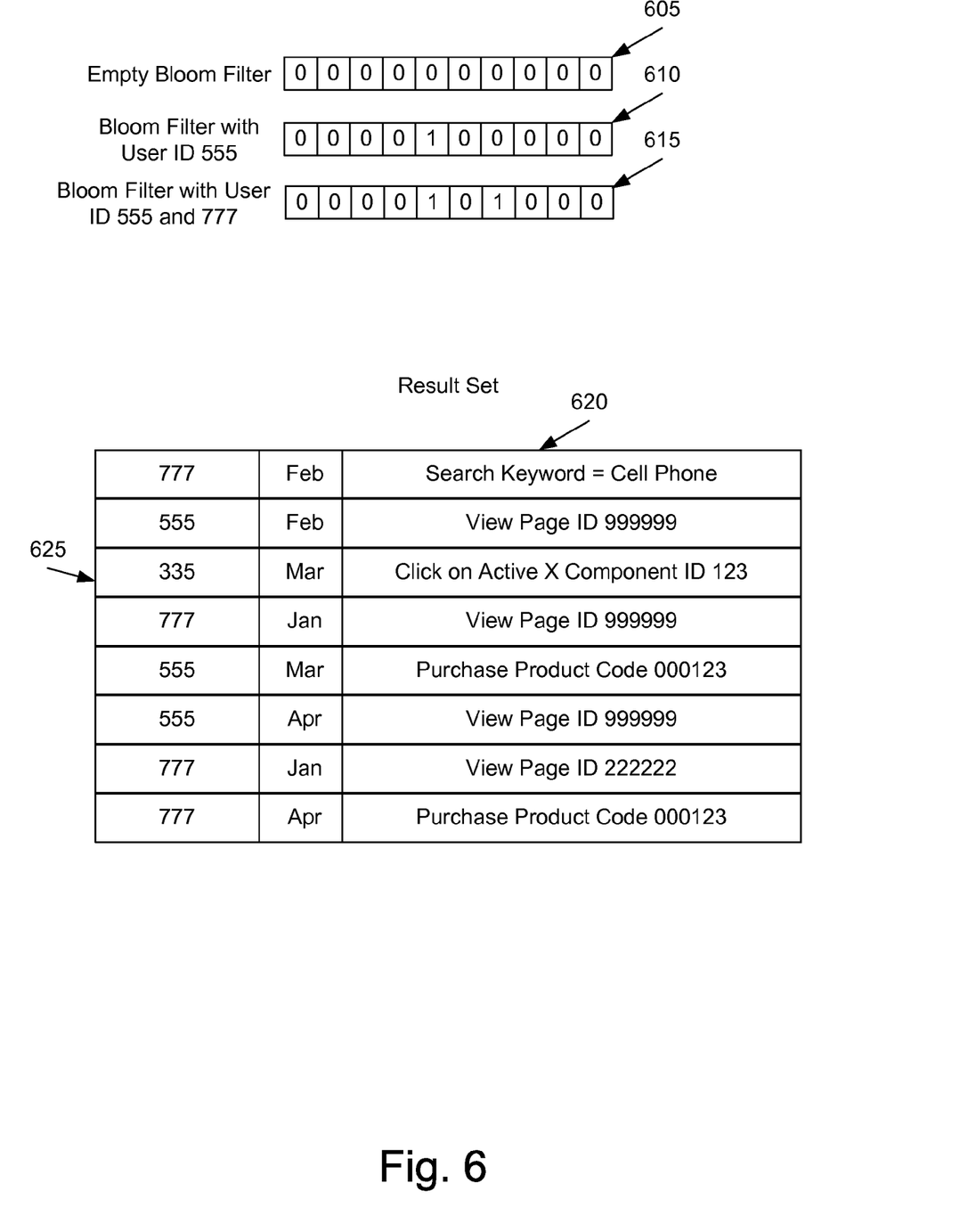
FIG. 6 depicts filtering a set of web usage activity by a single segment.

FIG. 6 depicts filtering a set of web usage activity by a single segment. In FIG. 6, the web usage activity as depicted in FIG. 2 is depicted as being filtered according to the segment definition 310 of FIG. 3. As shown in FIG. 3, segment 310 comprises two user IDs, 555 and 777. Due to the complexity of presenting a Bloom Filter containing millions of bits, FIG. 6 will be described with a Bloom Filter of only 10 bits. Furthermore, the Bloom Filter of FIG. 6 will also be presented with only one hash function. The hash function will simply be the last digit of the user ID indicates the bit position that should be set to a 1. For example, user ID 555 would result in the $5^{th}$ bit position being set to a 1. It should be understood that this simplification is only for the purpose of ease of description, and is not intended to be limiting. An actual implementation of embodiments of the disclosure would typically use a much larger Bloom Filter, as well as a larger number of hash functions.

The process may begin with an empty Bloom Filter 605. User ID 555, which is included in segment definition 310 may then be added to the Bloom Filter. According to the simplified hash function, the last digit of User ID 555 is 5, and thus the fifth bit of the Bloom Filter is set to 1, as depicted in Bloom Filter 610. The same process is performed for user ID 777, which results in the $7^{th}$ bit position being set, as is depicted in Bloom Filter 615. At this point, Bloom Filter 615 may be used to evaluate all of the web activity as depicted in FIG. 2.

Starting with the first entry in FIG. 2, a user ID of 999 is associated with the first entry. Processing user ID 999 with the defined hash function results in an indication that if user ID 999 is included in the Bloom Filter, the $9^{th}$ bit of Bloom Filter 615 will be set to a 1. As shown, this is not the case, so it can be positively stated that user ID 999 is not included in the Bloom Filter, and hence the first web activity of FIG. 2 should not be included in the results set.

Each activity in FIG. 2 can be processed according to the above description, and can be added to the result set 620 if the user ID is included in the Bloom Filter. Advantageously, the Bloom Filter allows for a deterministic number of computations to ensure that a particular element is not included in the Bloom Filter. In the present example with only a single hash function, only one comparison is necessary. In a case where there are larger number of hash functions, more comparisons will be necessary, however the total number of comparisons required is determined by the number of hash functions alone, without regard to the number of elements that have been added to the Bloom Filter.

In the present example, there are only two user IDs in the defined segment. Using a nested loop join, as described above, each activity would need to be compared to all of the user IDs in the segment before determining if the specific user ID is included in the segment. As the number of user IDs in the segment grows, the number of comparisons increases. The use of a Bloom Filter allows for a fixed number of comparisons to be made, regardless of how many users are included in the segment.

One potential downside to the use of a Bloom Filter for filtering activity data by user segment may be that a Bloom Filter does not prevent false positives. For example, using the simplified hash function presented above, user ID 335 indicates that the $5^{th}$ bit of the Bloom Filter should be set if the element is included in the Bloom Filter. The $5^{th}$ bit of Bloom Filter 615 is set, and as such, the User ID 335 is added to the results set, despite the fact that user ID 335 is not included in the defined segment.

In many uses of web analytics, large numbers of activities are being processed to determine statistical patterns. In such cases, a small number of false positive results may be statistically insignificant, and can be safely ignored. A proper selection of the size of the Bloom Filter as well as the number and design of the hash functions may be helpful in keeping the percentage of false positives to a level that is statistically acceptable.

In cases where the data must be free of false positives, optional additional processing may be performed on the result set. In some cases, the inefficient algorithms presented in the background section above may be used to filter out the false positive results from the result set. Because the initial filtering by the Bloom Filter will have prevented the vast majority of elements from the activities from entering the result set, the result set is significantly smaller than the overall set of activities. Processing the smaller set of results using one of the above mentioned algorithms, although still being inefficient, may be preferable to allowing the false positives to remain in the result set.

Figure 7:
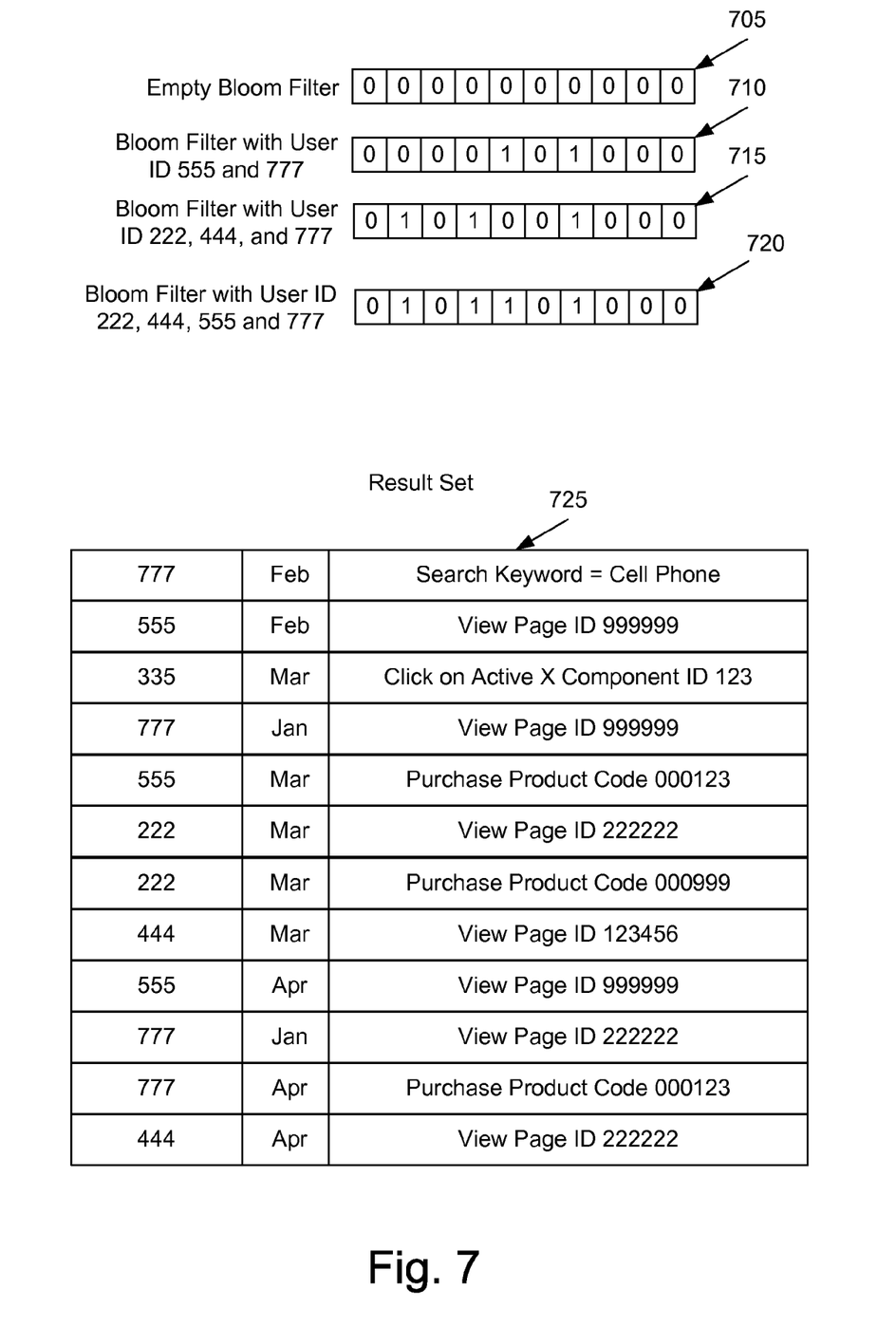
FIG. 7 depicts use of a Bloom Filter to filter web usage activity by multiple segments.

FIG. 7 depicts use of a Bloom Filter to filter web usage activity by multiple segments. Embodiments of the present disclosure advantageously provide for the ability to filter the activity data by multiple segments simultaneously. An empty Bloom Filter 705 which is 10 bits long and uses the same hash function as described with respect to FIG. 6 is shown. Bloom Filter 710 depicts the Bloom Filter after the user IDs from segment 310 have been added to the Bloom Filter. Bloom Filter 715 depicts a Bloom Filter as it would appear if the user IDs from segment 320 were added to it.

As long as the Bloom Filters are of the same length and use the same hash functions, Bloom Filters can simply be combined using a bitwise or operation. The resulting Bloom Filter 720 is the result of a combination of Bloom Filters 710 and 715. The web activity data may then be processed as explained above. However, the result set 725 will now include all user IDs that are in either segment 310 or segment 320, or both segments. The ability to combine Bloom Filters using a simple or operation advantageously allows for web activities to be filtered by more than one segment simultaneously. Furthermore, if necessary, the result set 725 may then be further processed by the Bloom Filters 710 and 715 individually, to further separate the activities. By initially combining the Bloom Filters, large numbers of web activities may be removed in a first pass, advantageously resulting in a much smaller and manageable result set 725.

Although generally presented in terms of online web activity, the use of a Bloom Filter is not limited to data sets that are collected exclusively on line. Both on and offline data sets can be analyzed in a similar fashion. For example, a retailer may maintain an online presence, while at the same time maintain traditional advertising or sales channels. One example of such a sales channel would be through the use of print advertising or standard mail advertising. A retailer may also use Bloom Filters to analyze sets of data when one or more of the sets does not come from an on line source, but rather comes from an offline source.

Elements of System

Figure 8:
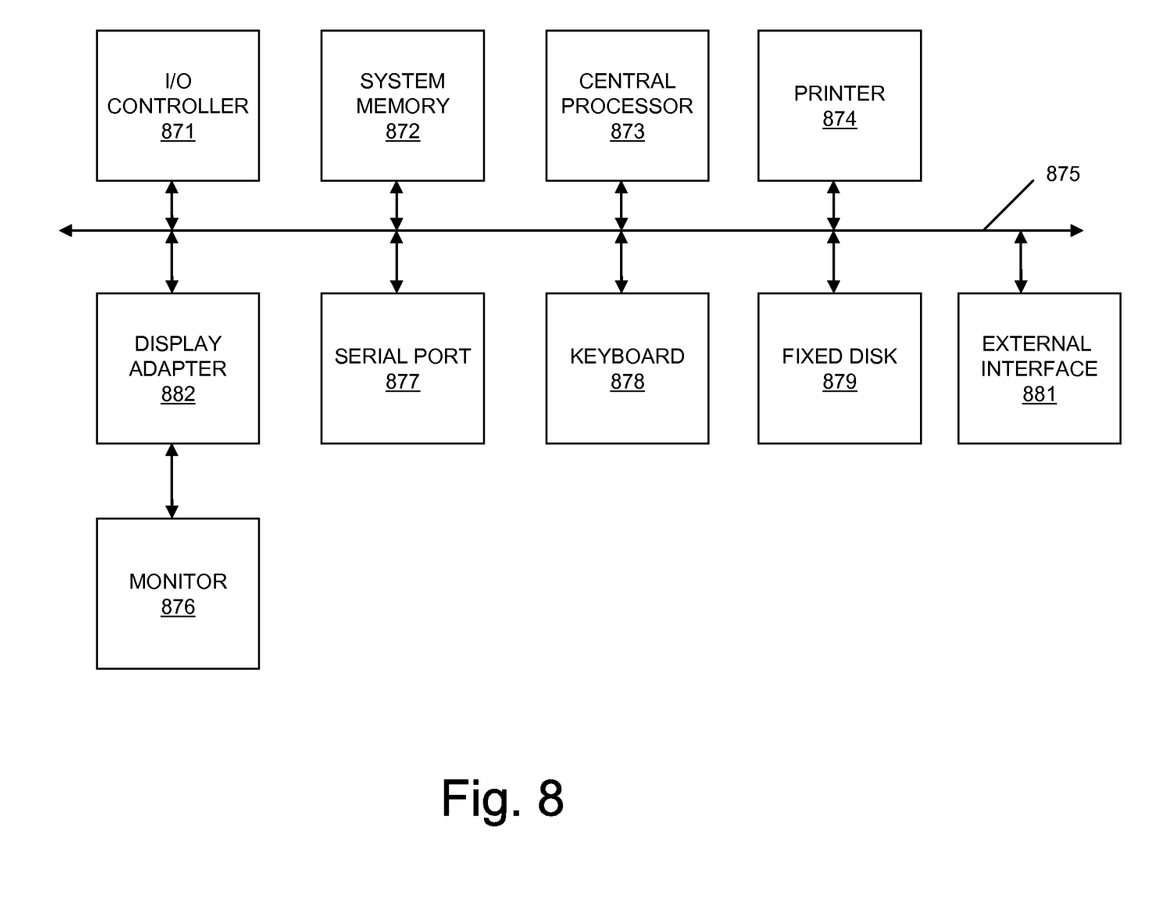
FIG. 8 depicts an exemplary computer system for use with embodiments of the disclosure.

The various participants and elements in described may operate or use one or more computer apparatuses to facilitate the functions described herein. Any of the elements may use any suitable number of subsystems to facilitate the functions described herein. Examples of such subsystems or components are shown in FIG. 8. The subsystems shown in FIG. 8 are interconnected via a system bus 875. Additional subsystems such as a printer 874, keyboard 878, fixed disk 879 (or other memory comprising computer readable media), monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a tangible computer readable medium. The tangible computer readable medium may contain computer code to implement methods of the present invention.

The above description is only an example of a computer apparatus to facilitate the functions of the present invention. Any other suitable apparatus may also be used in embodiments of the present invention. Examples of other types of suitable apparatus include Cell Phones, Personal Digital Assistants (PDA), desktop computers, lap top computers, internet enabled televisions, and the like. Any device that allows a user to access the internet would be suitable for use in embodiments of the present invention. Furthermore, communications between the various elements of the present invention have been described with respect to the Internet. Any other type of communications media, such as local and wide area networks, public and private networks, and wired and wireless networks may also be used in embodiments of the present application.

Although exemplary embodiments of the present invention have recited a single user and a single advertising content network, it would be clear to a person of skill in the art that the invention may be used to service any number of end users or advertising content networks.

A recitation of "a", "an" or "the" is intended to mean "one or more" unless specifically indicated to the contrary.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A non-transitory computer readable medium embodying a set of instructions that when executed by a processor cause the processor to perform the steps comprising:
    identifying a first set of data elements that satisfy a first criteria;
    entering identification information for each element of the first set of data elements into a bloom filter;
    applying the bloom filter to a set of user activities; and
    storing each element from the set of user activities that is included in the bloom filter in a results set;
    wherein the first set of data elements comprises a user segment, a user segment including a set of user identifiers that identify specific users;
    wherein the step of entering identification information for each element of the first set of data elements into a bloom filter further comprises:
        processing each user identifier of the set of user identifiers with at least one hash function, said hash function mapping the user identifier to a bit osition within the bloom filter; and
        setting the bit position identified by the at least one hash function to a value indicating true;
    wherein the at least one hash function further comprises:
    generating a 32 bit hash value of the user identifier;

calculating the modulus of the 32 bit hash value with a size of the bloom filter, a result of the calculation indicating the bit position within the bloom filter that should be set to true; and setting the bit position of the bloom filter corresponding to the result to true.

2. The tangible computer readable medium of claim 1 wherein the at least one hash function comprises six hash functions.

3. The tangible computer readable medium of claim 2 wherein the second set of data elements comprises activities performed by the second set of users.

4. The tangible computer readable medium of claim 3 further comprising:

identifying a second set of data elements that satisfy a second criteria; and entering identification information for each element of the second set of data elements into the bloom filter.

5. The tangible computer readable medium of claim 4 wherein applying the bloom filter to the set of user activities further comprises:

processing each user identifier associated with each user activity of the set of user activities with the six hash functions; and comparing the bit positions determined by the six hash functions with the corresponding bit positions in the bloom filter, wherein a match of all six bit positions indicates the user identifier associated with the user activity is included in the bloom filter.

6. The tangible computer readable medium of claim 4 wherein the bloom filter is 64 megabytes long.

7. A system comprising:

a processor; and a memory coupled to the processor, the memory comprising a set of instructions that when executed by the processor cause the processor to perform the steps of: identifying a first set of data elements that satisfy a first criteria; entering identification information for each element of the first set of data elements into a bloom filter; applying the bloom filter to a set of user activities; and storing each element from the set of user activities that is included in the bloom filter in a results set;

wherein the memory further comprises instructions for processing each user identifier of the set of user identifiers with at least one hash function, said hash function mapping the user identifier to a bit position within the bloom filter; and setting the bit position identified by the at least one hash function to a value indicating true;

wherein the at least one hash function comprises instructions for generating a 32 bit hash value of the user identifier; calculating the modulus of the 32 bit hash value with a size of the bloom filter, a result of the calculation indicating the bit position within the bloom filter that should be set to true; and setting the bit position of the bloom filter corresponding to the result to true.

8. The system of claim 7 wherein the at least one hash function comprises six hash functions.

9. The system of claim 8 wherein applying the bloom filter to the set of user activities further comprises instructions for processing each user identifier associated with each user activity of the set of user activities with the six hash functions; and comparing the bit positions determined by the six hash functions with the corresponding bit positions in the bloom filter, wherein a match of all six bit positions indicates the user identifier associated with the user activity is included in the bloom filter.

10. A method for processing user activity data comprising:

identifying a first set of data elements that satisfy a first criteria;

entering identification information for each element of the first set of data elements into a bloom filter;

applying the bloom filter to a set of user activities;

storing each element from the set of user activities that is included in the bloom filter in a results set;

processing, by a processor, each user identifier of the set of user identifiers with at least one hash function, said hash function mapping the user identifier to a bit position within the bloom filter; and setting the bit position identified by the at least one hash function to a value indicating true;

wherein the at least one hash function further comprises:

generating a 32 bit hash value of the user identifier;

calculating the modulus of the 32 bit hash value with a size of the bloom filter, a result of the calculation indicating the bit position within the bloom filter that should be set to true; and setting the bit position of the bloom filter corresponding to the result to true.

11. The method of claim 10 wherein the at least one hash function comprises six hash functions.

12. The method of claim 11 further comprising:

processing each user identifier associated with each user activity of the set of user activities with the six hash functions; and comparing the bit positions determined by the six hash functions with the corresponding bit positions in the bloom filter, wherein a match of all six bit positions indicates the user identifier associated with the user activity is included in the bloom filter.

* * * * *